LOGIC SYSTEMS

Filed March 14, 1960 5 Sheets-Sheet 1

CARL L. ISBORN INVENTOR.

BY Louis J. Knobbe

ATTORNEY

CARL L. ISBORN *INVENTOR.*
*BY* Louis J. Kobbe
ATTORNEY

CARL L. ISBORN *INVENTOR.*

*BY* Louis J. Knobbe
ATTORNEY

Dec. 15, 1964 C. L. ISBORN 3,161,867

LOGIC SYSTEMS

Filed March 14, 1960 5 Sheets-Sheet 4

CARL L. ISBORN *INVENTOR.*

BY Louis J. Knobbe

ATTORNEY

CARL L. ISBORN INVENTOR.

BY Louis J. Knobbe
ATTORNEY

United States Patent Office 3,161,867
Patented Dec. 15, 1964

3,161,867
LOGIC SYSTEMS

Carl L. Isborn, Richmond, Calif., assignor to Beckman Instruments, Inc., a corporation of California Filed Mar. 14, 1960, Ser. No. 14,835
13 Claims. (Cl. 340—347)

The present invention relates to logic systems and particularly to multi-light path logic systems.

For several years this inventor's assignee has been producing decimal counters which register voltage pulses applied at an input. Each counter decade ordinarily comprises four binary stages connected to produce ten discrete combinations of binary states. These stages usually incorporate vacuum tubes or transistors, thus affording only a small amount of power for energizing numerical displays. Accordingly, the type of display commonly utilized with such devices comprises ten neon lamps which are lit one at a time to display the value of the digit registered by the decade. A representative counter similar to that just described and utilizing transistor binary stages is shown in Patent No. 2,843,320 of H. C. Chisholm entitled "Transistorized Indicating Decade Counter" and assigned to the assignee of the present invention.

Recent developments in the field of digit display devices include a segmented display which provides an Arabic numeral type presentation. Neon lamps may be utilized to individually illuminate the segments or the segments may comprise electroluminescent elements. Such devices offer a very convenient digit display and it is desired to incorporate them in decimal counters. However, attempts to connect these readout devices directly to the counter decades have shown that it is impossible to obtain a bright readout without overloading the four binary stages. Moreover, the direct current output of the binaries will not operate the electroluminescent type device which requires an alternating current input.

Logic systems for driving these segmented displays from the outputs of a binary decimal counter may of course be constructed using prior are techniques. However, such systems require such costly items as diodes for the decoding of the low-level output from the four binary stages and the encoding of the multiple line input to the segmented visual display, transistor or vacuum tube power amplifiers for boosting the low-level outputs of the binaries to an adequate power level to drive the readout display, and an isolation transformer for handling the alternating current power required by the electroluminescent readout devices. These elements substantially increase the cost of the complete readout display, and therefore, considerably lessen its attractiveness as an addition to the presently manufactured decimal counters.

Accordingly, it is a primary object of this invention to provide an improved logic system for inexpensively connecting a segmented indicia readout device to a binary-decimal counter without overloading the binary stages.

A further object of this invention is to provide a logic system which does not require any diodes, transistors or vacuum tube power amplifiers, or isolation transformers.

It is another object of this invention to provide a logic system in which light rays replace diodes and conventional wired connections without requiring any lenses, mirrors, beam splitters or other optical devices.

It is still another object of this invention to provide a logic system in which photoconductive elements are used for logical gating, as well as for power amplification.

Other and further objects, features and advantages of the invention will become apparent as the description proceeds.

Briefly, in accordance with a preferred form of the present invention, a logic system comprises a plurality of light sources such as neon lamps, a plurality of light sensitive elements such as photoconductors, and a plurality of light paths greater in number than said photoconductors for selectively coupling the light sources to the sensitive elements. The light rays transmitted from the light sources are unilateral by nature and do not require the diodes used in conventional logic circuits. The light source and photoconductor combinations operate as switches, the photoconductor having a low resistance when activated and a high resistance when inactivated.

A logic system useful for operating a segmented indicia readout device basically converts from a first predetermined code system in which each indicia is represented by a discrete input signal to a second predetermined code system adapted for controlling the segmented display. The first code may be conveniently read into the system by utilizing the lamps of the prior art readout device which are lit one at a time to indicate the indicia. These lamps selectively illuminate a plurality of photoconductors which in turn control the readout segments.

In the preferred digit readout system, the segments are normally energized by an appropriate power source. The desired digits are then displayed by inhibiting or turning off the required segments. Appropriate inhibit connections are provided by connecting the plurality of photoconductors in parallel with respective readout segments. When activated, the photoconductor acts as an ON switch and bypasses the current from its associated readout segment.

A more thorough understanding of the invention may be obtained by a study of the following detailed description taken in connection with the accompanying drawings, in which—

Figure 1:
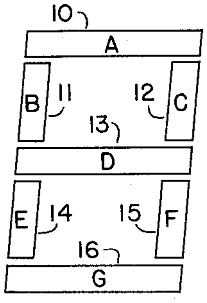
FIG. 1 is a plan view of a segmented representative Arabic numeral readout device which is utilized in this invention.

A representative segmented digit readout device is illustrated in FIG. 1 and comprises seven segments 10, 11 12, 13, 14, 15 and 16 labeled A, B, C, D, E, F and G. It will be readily observed that each of the Arabic numerals may be formed by lighting appropriate segments. Thus, a "0" may be displayed by lighting the A, B, C, E, F and G segments, a "1" may be displaced by lighting the C and F segments, a "2" may be displayed by lighting the A, C, D, E and G segments, and so on for the digits "3" through "9." However, it has been found that there is a significant reduction in system complexity if all of the elements A through G are turned on by connection to an appropriate power source. The desired numerals are then displayed by selectively turning off or inhibiting the necessary segments. This latter system requires only twenty-one "inhibit" signals for producing the ten Arabic numerals 0 through 9, whereas if the required segments are selectively energized, a total of 49 "enable" signals are required. An additional feature obtainable by inhibiting selected lamps is that the numeral "8" is formed automatically upon energization of all segments and therefore requires no control signals for accomplishing same.

In the table below are tabulated the various control signals required for inhibiting the correct lamps for accomplishing the display of each numeral. Also, by way of comparison are shown the control signals required if only those segments required are turned on.

| Arabic Number | Segments Inhibited | Segments Energized |
|---|---|---|
| 0 | D | A, B, C, E, F, G |
| 1 | A, B, D, E, G | C, F |
| 2 | B, F | A, C, D, E, G |
| 3 | B, E | A, C, D, F, G |
| 4 | A, E, G | B, C, D, F |
| 5 | C, E | A, B, D, F, G |
| 6 | C | A, B, D, E, F, G |
| 7 | B, D, E, G | A, C, F |
| 8 | | A, B, C, D, E, F, G |
| 9 | E | A, B, C, D, F, G |

Figures 2, 4:
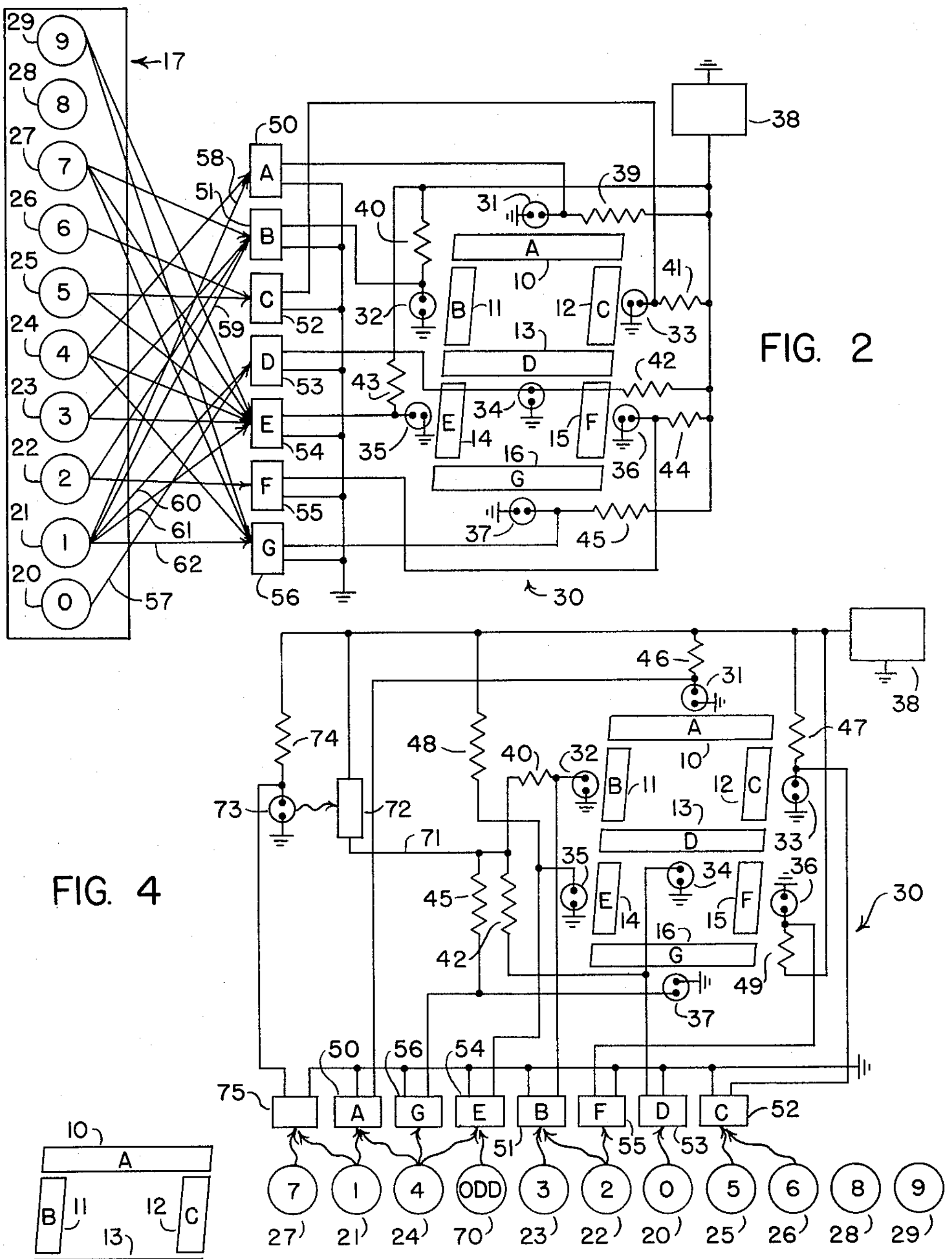
FIG. 2 is a diagram schematically depicting optical and electrical parts of a readout system constructed in accordance with this invention.
FIG. 4 is a schematic view of an alternate and preferred embodiment of this invention.

In FIG. 2 is shown one embodiment of a complete readout device constructed in accordance with this invention. This device is compatible with the decimal counters which are presently manufactured, and may be connected to the output of prior art visual readout devices. A representative prior art readout device is shown generally at 17 and includes the ten neon bulbs 20, 21, 22, 23, 24, 25, 26, 27, 28 and 29 which respectively indicate when lit a decimal count of zero to nine. The segmented readout device 30 includes the previously described segments 10 through 16 and also neon lamps 31 through 37, each of which is proximately located to a respective segment, e.g., neon lamp 31 is positioned to illuminate the "A" segment 10 and lamp 32 is positioned to illuminate the "B" segment 11. It will be understood that other types of light sources may be utilized to illuminate the segmented readout device. The recently developed electroluminescent devices are particularly adapted for this purpose and may be utilized with this invention.

All of the segments are energized by connecting the neon lamps 31 through 37 to a suitable power source 38. In series with the lamps are respective resistors 40, 41, 42, 43, 44 and 45 which prevent shorting of the power source when a segment lamp is inhibited. For operation of neon lamps, the power source 38 may be either a direct current or alternating current source of sufficient voltage to fire the lamp. Alternating curent will ordinarily be desired for longer life of neon bulbs and is required for electroluminescent devices. A representative electroluminescent device manufactured by the Radio Corporation of America requires a voltage of 200 volts r.m.s. at 1800 c.p.s.

Inhibit operation of the segment lamps 31 through 37 is accomplished by connecting each lamp in parallel with a respective one of the light sensitive elements 50, 51, 52, 53, 54, 55 and 56 labeled A through G to indicate which lamps they are connected to. These light sensitive elements are preferably photoconductors of the cadmium sulfide or cadmium selenide type; these are characterized by varying in resistance in response to the light energy received. When no light is received their resistance is high; when lit by one of the lamps 20 through 29 their resistance is low. Accordingly, photoconductor 50 connected in parallel with lamp 31 by having one of its terminals connected to ground and the other of its terminals connected between the lamp 31 and resistor 39, will not affect the operation of lamp 31 when it does not receive any light energy. When, however, light rays are received on its sensitive face, a low resistance is connected across neon lamp 31 thereby reducing its potential to less than its firing potential, resulting in lamp 31 being inhibited or turned off. In like manner, the photoconductors 51 through 56 are so connected to selectively inhibit the other segments of the readout device 30.

The appropriate logic for selectively inhibiting the correct segments is provided by a plurality of light paths connecting the lamps of the readout device 17 with the photoconductors 50 through 56. The individual light paths are represented by arrows in FIG. 2, and as will be seen hereinafter, these light paths may be provided in a single plane by a plurality of line of sight paths. Referring now to the table above, the Arabic numeral "0" requires inhibiting the D segment 13. Accordingly, a light path denoted by light arrow 57 is provided between the "0" lamp 20 and the D photoconductor 53. Since photoconductor 53 is connected in parallel with the D segment, the D segment is inhibited whenever photoconductor 53 receives a light ray. In a similar manner, a numeral "1" requires inhibiting the A, B, D, E and G segments. Accordingly, as shown, a light arrow 58 connects lamp 21 with the A photoconductor 50, a light arrow 59 connects lamp 21 with the B photoconductor 51, a light arrow 60 connects lamp 21 with the D photoconductor 53, a light arrow 61 connects lamp 21 with the E photoconductor 54, and a light arrow 62 connects lamp 21 with the G photoconductor 56. In a similar manner, the lamps 22 through 29 are allowed to transmit light energy to only selected ones of the photoconductors in order to provide the required logic. As hereinbefore noted, the numeral "8" is generated automatically by maintaining each of the segments in the normally energized state. Therefore, no light input from the "8" lamp 28 is required.

Figure 3:
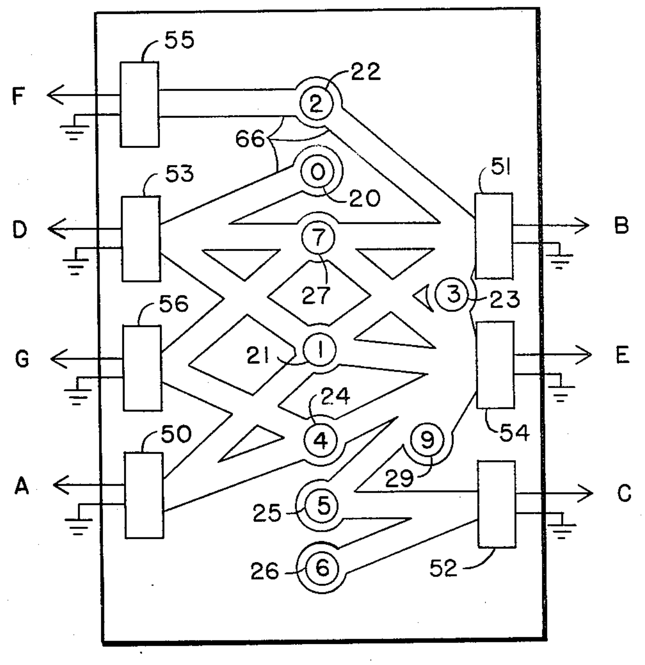
FIG. 3 is a cross-sectional view of a baffle structure for the readout device of FIG. 2.

In FIG. 3 is shown a cross-sectional view of a structure suitable for constructing the plurality of light paths shown schematically in FIG. 2. The seven photoconductors 50 through 56 are mounted in a block 65 which is molded, drilled or otherwise provided with a plurality of baffles 66 which form the light passageways interconnecting the neon lamps 20 through 29 of the prior art readout 17. The baffles may be painted or coated with an opaque black coating so as to reduce any reflection of the light therefrom, thereby preventing any light transmission to an incorrect photoconductor. By rearranging the input lamps 20–29 in the manner shown, the photoconductors 50–56 may be located on both sides of the lamps for minimum distance between communicating lamps and photoconductors thus improving the signal to noise ratio.

It is to be noted that no lenses, mirrors, beam splitters or other optical devices are required in the logic system of this invention. Also, the light paths may all be located within the same plane, and freely cross each other as shown; no "insulation" is required for the light ray interconnections as contrasted with electrical circuitry. Of special significance is that a beam of light is unilateral by nature and does not require the diode used in conventional logic circuits.

Another and preferred embodiment of this invention is shown in FIG. 4, in which a considerable reduction in the number of light paths is accomplished with only a modest increase in circuit complexity. By referring to the table above, it may be noted that segments B, D and G are inhibited in common to display both the digits "1" and "7." Switching these elements as a group results in a considerable reduction in light paths. Also, it may be noted that the E segment is inhibited for each odd number. Therefore, providing a separate input indicative of odd and even numbers will enable a still further reduction in light paths. An additional simplification is also provided in that the number "9" is automatically generated by the odd control since only the E segment is inhibited for the presentation of this number. These simplifications reduce the total number of light rays converging upon a single photoconductor to two, whereas in readout display shown in FIGS. 2 and 3, six light rays are received at the E photoconductor 54. Also, a maximum of three photoconductors are activated by a single lamp in the embodiment of FIG. 4, whereas in the display previously shown the maximum was five.

Appropriate inhibiting of the B, D and G segments for the "1" and "7" digits is provided by a pair of switches maintained in the respectively opposite states; i.e., when a first switch responsive to digits "1" and "7" is ON, a second switch in series with the B, D and G segments is OFF and vice versa. The first switch comprises the lamps 21 and 27 actively coupled with a photoconductor 75. The second switch comprises a lamp 73 actively coupled with a photoconductor 72. Lamp 73 is connected to the power source 38 through series resistor 74 to normally activate photoconductor 72. The first and second switches are maintained in the respectively opposite states by connecting photoconductor 75 in parallel with lamp 73. As a result, when the first switch is OFF (neither lamp "1" nor "7" are lit) the second switch is ON (lamp 73 is lit). When the first switch is ON (either lamp "1" or "7" are lit) the second switch is OFF (lamp 73 is inhibited). The series connection between the second switch and the B, D and G segments is provided by connecting the series resistors 40, 42 and 45 to a common conductor 71. Conductor 71 is in turn connected to power source via series connected photoconductor 72. Bulbs 32, 34 and 37 respectively illuminating segments B, D and G then have a high impedance connected between them and the power source 38 when the photoconductor 72 is inactivated.

The inhibition of the E segment for odd numbers is provided by an additional ODD indicator lamp 70. In counters such as described above which employ binary stages, the first binary stage will alternately represent a binary "0" and a binary "1" for respectively even and odd numbers. A neon lamp 70 connected to the first binary for indicating the state thereof will thus indicate an odd number when ON and an even number when OFF. The ODD lamp 70 is therefore used to activate the E photoconductor 54 and will inhibit the E segment each time an odd number is registered by the counter.

The structure and function of the remainder of the system shown in FIG. 4 may be similar to the embodiment of FIG. 2 and those components which may be identical with those shown prior are provided with the same nomenclature. Thus, segmented display 30, the lamps 20–29 and photoconductors 50–56 may be the same as heretofore shown. These lamps and photoconductors have, however, been rearranged as shown to simplify the light paths. Thus, by way of example, lamps 21 and 24 (digits "1" and "4") are adjacently positioned since both must illuminate the A photoconductor 50. No photoconductors are required adjacent either the lamps 28 or 29 (digits "8" or "9") since these digits are generated automatically by this display device.

Figure 5:
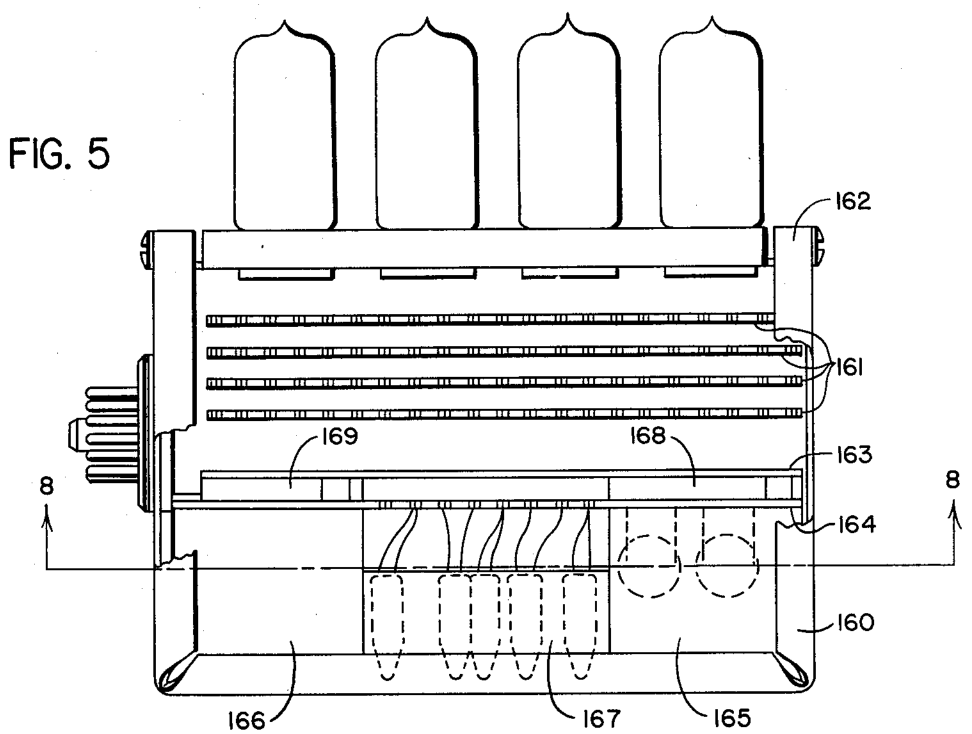
FIG. 5 illustrates a plan view of a binary-decimal counter incorporating a logic system of this invention.

A complete decimal counter having a readout display constructed in accordance with this invention is shown in FIG. 5. A substantially rectangular frame 160 encompasses a plurality of circuit mounting boards 161 mounting the circuit elements of each binary stage and a base 162 which mounts four dual triode vacuum tubes each of which comprises one stage of a four stage decimal counter. Circuit mounting boards 163 and 164, baffle elements 165 and 166 and readout element 167 also mounted within frame 160 comprise the readout display of this invention.

Figure 6:
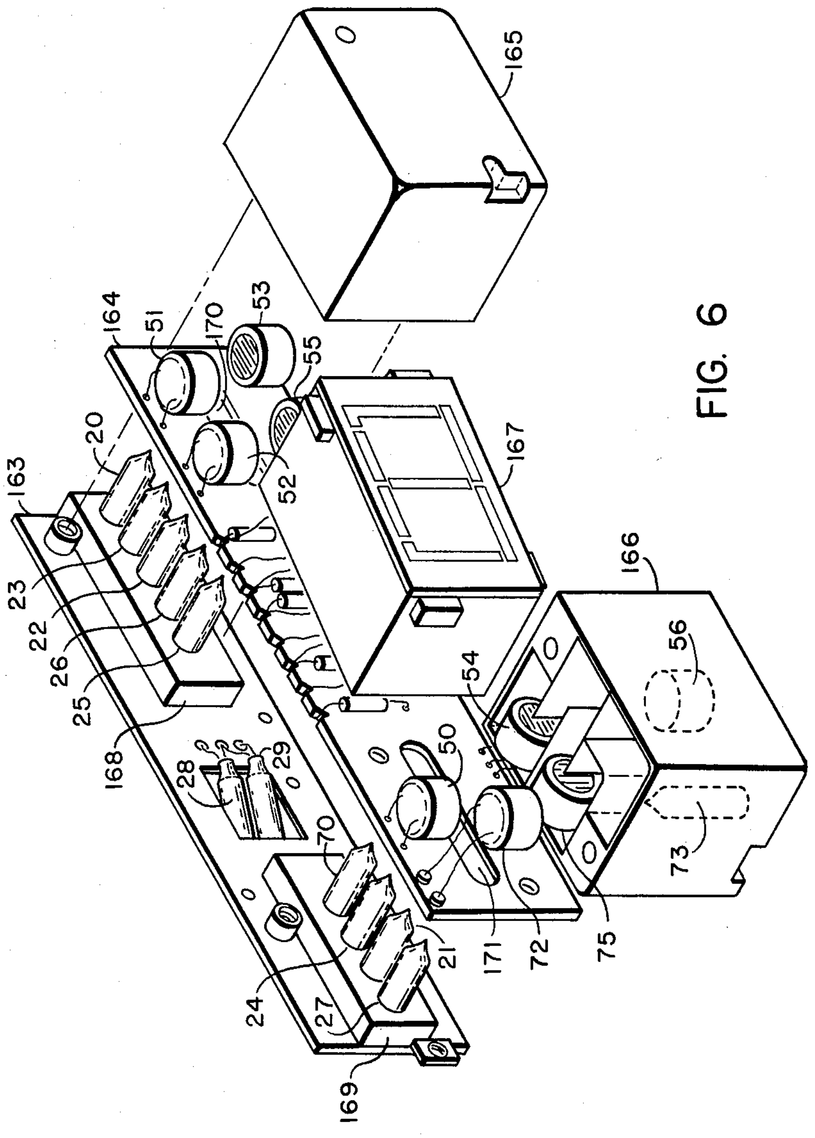
FIG. 6 is an exploded view of the components of FIG. 5 which make up the readout logic system.

Circuit mounting boards 163 and 164 are shown in further detail in the exploded view of FIG. 6. Referring now to this figure, board 163 provides a mounting for neon lamps 20–29 and 70. Lamps 20–27 and 70 are mounted upright; lamps 28 and 29 (the "8" and "9" indicating lamps) while not being used as inputs by the present readout device may be required for the correct functioning of the lamps 20–27, and are therefore shown mounted within suitable openings in the board 163.

Mounting board 164 provides the support for photoconductors 50, 51, 52, 53, 54, 55, 72 and 75. These photoconductive elements are also mounted upright and so positioned that when boards 163 and 164 are mounted in close relationship, their light sensitive faces will be in close proximity to the correct neon lamps.

Figure 7:
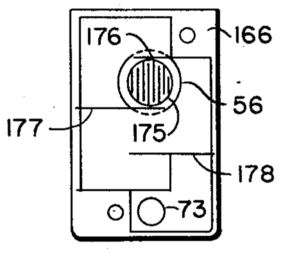
FIG. 7 is a plan view of one of the baffle elements used in the ambodiment shown in FIGS. 5 and 6.

Encompassing and enclosing the photoconductors and neon lamps are two light baffle elements 165 and 166. These elements may be conveniently molded from an opaque plastic material and are preferably black in color for reducing internal light reflections. Baffles 165 and 166 are substantially hollow members as shown in the bottom view of baffle 166 in FIG. 7 and include mounting holes 180. Baffle element 165 directs the light from neon lamps 20, 22, 23, 25 and 26 to the selected ones of photoconductors 51, 52, 53 and 55. Baffle element 166, as shown in FIG. 7 and the dotted lines of FIG. 6, retains neon lamp 73 and photoconductor 56. This element also includes light shields for properly directing light output from neon lamps 21, 24, 27, 70 and 73 to the proper ones of photoconductors 50, 54, 56, 72 and 75.

The decimal readout display 167 may be conveniently mounted between the baffle elements 165 and 166. A suitable window in frame 160 exposes the face of the display 167 for viewing purposes.

No circuit connections have been shown in FIGS. 5 through 8 since it will be understood that the elements shown will be connected in the manner of the schematic shown in FIG. 4. The required series resistors between the neon lamps of the readout display 167 and the power source may be conveniently mounted on board 164 in the space provided between the groups of photoconductors.

Figure 8:
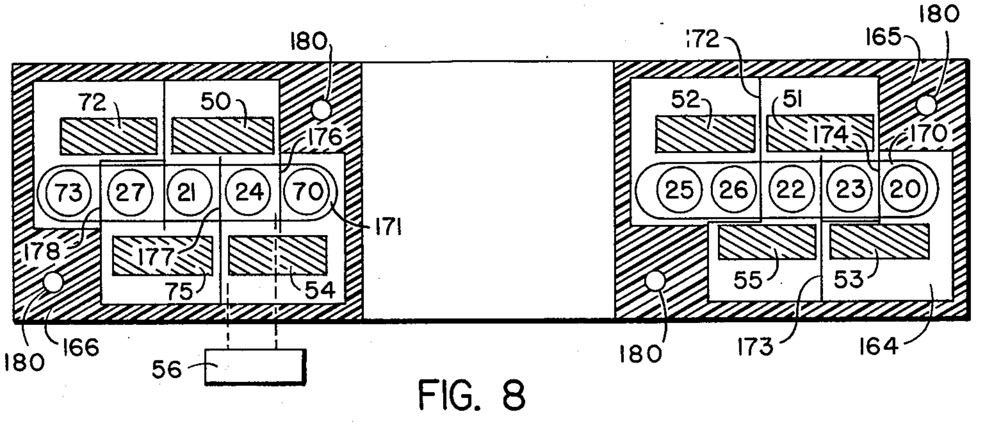
FIG. 8 is a cross-sectional view taken on line 8—8 of FIG. 5.

The operation of the device of FIG. 5 may be most easily understood by referring to FIG. 8 wherein is shown a cross-sectional view of the display portion of the decimal counter. Photoconductor mounting board 164 includes two extended slots 170 and 171 each having a width of slightly greater dimension than the diameter of the neon lamps. Neon lamps 20–27, 70 and 73 are positioned within the slots so as to be in close proximity to the photoconductive elements. The photoconductors are mounted on board 164 on both sides of the slots 170 and 171 with their light sensitive cells facing towards the slots. Baffle elements 165 and 166 provide light tight enclosures for the neon lamps and photoconductors extending within their walls. These elements are mounted flush with mounting board 164 to prevent extraneous light from striking the photoconductive elements. Light is prevented from entering through slots 170 and 171 by pads 168 and 169 of opaque compressible material mounted between boards 163 and 164.

Baffle element 165 includes light shields 172, 173 and 174 for activating the correct photoconductor(s) by the correct neon lamp(s). These shields may be constructed by any thin opaque sheet material and are preferably coated black for reducing light reflections. Shield 172 is a substantially L-shaped member enclosing neon lamps 25 and 26 and photoconductor 52. Referring to FIG. 4, it will be noted that this structure provides the proper inhibit signals for generating the numerals 5 and 6. Shield 173 is a planar member mounted perpendicular to one wall of baffle element 165 and serves to enclose neon lamp 22 and photoconductor 55. Shield 174 is L-shaped and serves to enclose neon lamp 23 with photoconductor 51 and also enclose neon lamp 20 with photoconductor 53, thereby insuring that the proper photoconductors are activated by the correct neon lamps.

Baffle element 166 includes light shields 176, 177 and 178 which serve a function analogous to that provided by shields 172, 173 and 174 of baffle element 165, and in addition provides a mounting for neon lamp 73 and photoconductor 56. As shown in FIGS. 7 and 8, the sensitive face 175 of photoconductor 56 is exposed only to neon lamp 24 (as required for displaying the numeral 4) and is prevented from being activated by adjacent neon lamps 21 and 27 by shields 176 and 177. Neon lamp 73 mounted by baffle element 166 and photoconductor 72 are enclosed by shield 178.

By way of illustration only, the following components are given as typical of those which may be utilized to provide the readout display shown in FIGS. 4–8.

| | |
|---|---|
| Neon lamps 20–29, 70, 73 | NE81. |
| Photoconductors 50–56, 72, 75 | B8–731–03. |
| Resistors 40, 42, 45 | 33K ohms. |
| Resistors 46, 47, 48, 49, 74 | 39K ohms. |
| Power source 38 | 300 volts A.C. |

Figure 9:
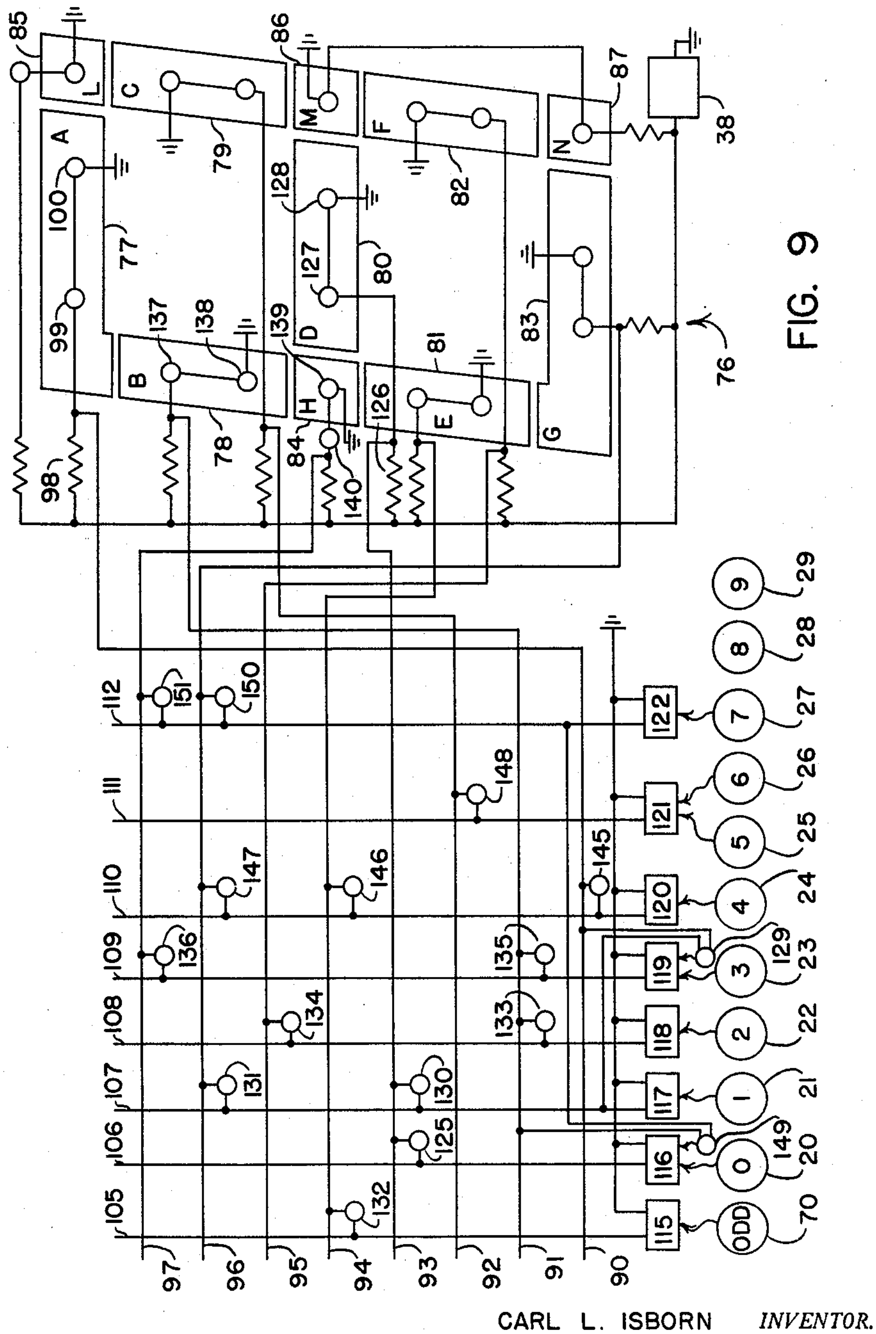
FIG. 9 illustrates schematically another embodiment of this invention.

The digit display devices hereinbefore described utilize a plurality of light rays for replacing wired connections and logic components. This type of construction will ordinarily be desired because of the lower costs resulting from reduced assembly time and the use of fewer components. In some instances, however, the use of additional electrical circuitry may be warranted. A system using fewer light paths but additional circuitry is shown in FIGURE 9. Also illustrated in this figure is a modified type of readout device which may also be used with any of the embodiments heretofore described.

The modified readout device includes additional segments for eliminating the discontinuities inherent in a seven segment display. As shown in FIG. 9, the readout 76 includes segments 77, 78, 79, 80, 81, 82 and 83 analogous to segments A, B, C, D, E, F, and G of the readout device of FIG. 1. In addition, segments 84, 85, 86, 87 respectively labeled H, L, M and N are used to eliminate the discontinuities presented by the readout device of FIG. 1 for certain numeral presentations. Segments L, M and N are continuously lighted for each of the numbers 0 through 9. Segment H is required to be inhibited when the numerals 1, 3 and 7 are displayed; circuitry for achieving this operation will be described hereinafter. An additional lamp is shown in each of the segments A through G for greater light output and greater legibility.

Inhibit circuit connections to each of the display segments A through H are made by conductors 90, 91, 92, 93, 94, 95, 96 and 97 respectively labeled A through H so as to indicate to which segment they are connected. Each of the conductors are connected between the series connected resistor and lamp pair, e.g., the A conductor 90 is connected between resistor 98 and the lamp pair comprising lamps 99 and 100 which illuminate the A segment.

Conductors 90 through 97 are connected to predetermined ones of conductors 105, 106, 107, 108, 109, 110, 111 and 112 by a plurality of neon lamps. As will be shown in more detail below, these lamps function as OR circuits for preventing inhibiting of incorrect segments.

Conductors 105 through 112 are selectively connected to ground through respective photoconductors 115, 116, 117, 118, 119, 120, 121 and 122. In proximate relationship with a predetermined photoconductor are the ten lamps 20 through 29 of the prior art readout device plus the additional ODD indicating lamp 70 connected to the decimal counter in the manner described hereinbefore. Light baffles or channels similar to those shown above permit only the light rays shown in FIG. 9. In this embodiment the maximum number of light rays converging on one single photoconductor are two (photoconductor 121) and the maximum number of photoconductors activated by a single lamp is one.

The operation of the readout system of FIG. 9 is as follows. The "0" lamp 20 when lit activates photoconductor 116 resulting in grounding conductor 106. Neon OR lamp 125, having one terminal connected to conductor 106, is also connected to ground. The other terminal of OR lamp 125 is connected to the D conductor 93 which is connected to power source 38 through resistor 126. As a result, OR lamp 125 fires. OR lamp 125 and the rest of the interconnecting OR circut lamps are selected to have a firing voltage which is less than the firing voltage of the two series connected display lamps such as lamps 127 and 128. If the OR lamps are the same as the readout lamp, no selection is required since a single lamp will always fire at a lower voltage than two lamps in series.

Since OR lamp 125, when connected to ground through photoconductor 116, is in shunt with series connected lamps 127 and 128, these lamps will be inhibited since the voltage applied is less than their firing potential. Thus, lighting of the "0" lamp 20 properly results in inhibiting the D segment 80.

An energization of the "1" lamp 21 results in photoconductor 117 being activated thereby grounding conductor 107. Neon OR lamps 129, 130 and 131 respectively connect conductor 107 to the A conductor 90, the D conductor 93 and the G conductor 96 and as a result the A, D, and G segments of display 76 are inhibited. In a similar manner, connections could have been made from conductor 107 to the B, E, and H conductors. However, this number of OR lamps drawing current through the single photoconductor 117 would have placed an excessive load thereon. Common inhibit requirements for different numerals allow the number of lamps connected to any one photoconductor to be reduced. Thus, the B and H segments are inhibited in common for the display of numbers "1" and "3." A reduction of the number of lamps energized by the photoconductor 117 is provided by placing OR lamp 129 proximate to photoconductor 119. Lamp 129 activates photoconductor 119 thereby energizing OR lamps 135 and 136 respectively connected to the B and H conducting lines 91 and 97. The B segment 78 includes a pair of series connected neon lamps 137 and 138. The H segment 84 because of its smaller dimensions requires only a single neon lamp 139. However, in order that the firing potential of the H segment be higher than the firing potential of OR lamp 136, an additional lamp 140 is connected in series with lamp 139. Thus, when OR lamps 135 and 136 are energized, the B and H segments 78 and 84 are inhibited.

The E segment is also required to be inhibited for the display of the numeral "1" and this operation is performed by the ODD lamp 70. This lamp is proximately located to photoconductor 115 for activating same. Conductor 105 is thereby grounded resulting in the energization of OR lamp 132 connected to the E conductor 94. As a result the E segment 81 is inhibited for each odd number.

An energization of the "2" lamp 22 causes photoconductor 118 to be activated thereby energizing OR lamps 133 and 134 which are respectively connected to the B and F conductors 91 and 95. As a result, the B and F segments are inhibited so as to provide a presentation of the numeral "2."

The "3" lamp when energized activates photoconductor 119 for inhibiting the B and H segments. The lighting of the "4" lamp activates photoconductor 120 and causes the energization of OR lamps 145, 146 and 147 respectively connected to the A, E and G conductors. Segments A, E and G of readout display 76 are thereby inhibited.

The "5" and "6" lamps 25 and 26 are positioned to each activate photoconductor 121 and thereby ground conductor 111. OR lamp 148 will then be energized and inhibit the C segment 79 connected thereto. The selection of numerals "5" and "6" is then made by the ODD lamp 70 which inhibits the E segment 81 for the numeral "5".

The "7" lamp 27 is positioned to activate photoconductor 122 and thus ground conductor 112. The display of the numeral "7" requires the inhibiting of several segments of the display 76, such that photoconductor 122 would be overloaded. For this reason, OR lamp 149 which connects conductor 112 to the B conductor 91, is positioned to activate photoconductor 116. Thus, the D segment 80 is inhibited by the photoconductor 116. The E segment 81 is inhibited by photoconductor 115 so that a maximum of three segments (B, G and H) are required to be directly connected to photoconductor 122. OR lamps 150 and 151 are respectively connected between conductor 112 and the G and H conductors 96 and 97 for inhibiting the G and H segments 83 and 84.

As in the embodiments above, no additional circuitry is required for displaying the numerals "8" and "9."

The OR lamps such as lamp 125 are required for preventing improper "sneak" paths which would otherwise cause faulty digit display. By way of example, if the conductors were directly connected together instead of through OR lamps, a lighting of "0" lamp 20 would result in a grounding of conductor 93 through photoconductor 116. This ground would also then be connected to conductor 107 by the direct connection replacing OR lamp 130 and to the A conductor 96 by the direct connection replacing OR lamp 131. As a result, the A segment would be improperly inhibited thereby presenting an erroneous readout display.

Although exemplary embodiments of the invention have been dislosed and discussed, it will be understood that other applications of the invention are possible and that the embodiments disclosed may be subjected to various changes, modifications and substitutions without necessarily departing from the spirit of the invention.

I claim:

1. A logic system comprising a plurality of light sources selectively energized in a first predetermined code system, a plurality of means responsive to light energy, and means for providing a plurality of discrete light paths greater in number than said plurality of light responsive means interconnecting selected ones of said light sources and said light responsive means so that any given light source illuminates a majority of the entire area of one or more of said light responsive means, whereby an output is generated by said light responsive means in a second predetermined code system.

2. A logic system for energizing a visual indicia readout device having a plurality of normally lighted segments, comprising a plurality of light responsive means equal in number to the number of said segments selectively activated by a plurality of input lamps which are lit one at a time to indicate predetermined indica, means for providing a plurality of discrete light paths greater in number than said light responsive means interconnecting respective selected ones of said lamps with respective predetermined ones of said light responsive means and interconnecting respective selected ones of said lamps with predetermined groups of said light responsive means, and means for connecting said light responsive means in parallel with said lighted segments so that the appropriate segments are inhibited for displaying the indicia denoted by the lighted input lamp.

3. A logic system for energizing a numeral readout device having at least seven lighted segments, comprising a plurality of lamps which are lit one at a time to indicate each of the Arabic digits except "8," at least seven photoconductors respectively connected in parallel with said lighted segments, and a plurality of light paths greater in number than said photoconductors interconnecting each of said lamps to a single one or more of said photoconductors so that the appropriate segments are inhibited for displaying the numeral indicated by the lighted lamp.

4. A system for displaying the Arabic digits zero through nine comprising a plurality of lamps lit one at a time for respectively indicating the digits "0," "1," "2," "3," "4," "5," "6," and "7"; a lamp which is lit each time an ODD number is indicated; a readout display having seven segments arranged to represent when properly lit the Arabic digits; a power source, a photoconductor in series with the second, fourth and seventh segments and said power source; means connecting said first, third, fifth and sixth segments to said power source; first, second, third, fourth, fifth, sixth and seventh photoconductors respectively connected in parallel with said seven segments for inhibiting the respective segment when activated; another lamp connected to said power source; another photoconductor connected in parallel with said other lamp; means for shielding said other lamp and said series connected photoconductor so that said series connected photoconductor is activated only by said other lamp; means for shielding said first photoconductor and said "1" and "4" indicating lamps; means for shielding said second photoconductor and said "2" and "3" indicating lamps; means for shielding said third photoconductor and said "5" and "6" indicating lamps; means for shielding said fourth photoconductor and said "0" indicating lamp; means for shielding said fifth photoconductor and said ODD and "4" indicating lamps; means for shielding said sixth photoconductor and said "2" indicating lamp; means for shielding said seventh photoconductor and said "4" indicating lamp; and means for shielding said other photoconductor and said "7" indicating lamp.

5. A decimal digit readout system comprising a normally energized segmented display device characterized by having one segment which is inhibited for each odd decimal digit, a switch responsive to an indicated odd digit comprising a lamp which is lit for each odd digit actively coupled with a light responsive means, and means connecting said switch in parallel with said one segment comprising a parallel connection between said photoconductor and said one segment.

6. A logic system for energizing a visual readout device having a plurality of lighted segments, comprising a plurality of radiant energy sources which are energized one at a time to represent all but one of a plurality of indicia, a plurality of radiant energy responsive devices respectively connected in parallel with said lighted segments, and means for providing a plurality of discrete radiant energy paths greater in number than said devices interconnecting respective selected ones of said sources with respective predetermined ones of said devices and interconnecting respective selected ones of said sources with predetermined groups of said devices so that the illumination of the appropriate segments is inhibited for displaying the indicia indicated by the energized source.

7. A logic system as in claim 6 wherein one of said segments is individually lighted by a pair of series connected neon lamps; a series circuit comprising a power source, a resistor, and said pair of series connected neon lamps; a single neon lamp; and another series circuit comprising said single neon lamp, one of said radiant energy responsive devices, said resistor and said power source.

8. A logic system for operating an indicia readout display, said display having a plurality of individually lighted segments, said display being characterized by having a first segment inhibited in common for first and second indicia, said first indicia further requiring the inhibiting of a second segment, a first input light source indicating said first indicia actively coupled to a first light sensitive means, means connecting said first light sensitive means to said second segment so that said second segment is inhibited when said first light sensitive means is activated, another light source responsively connected to said first light sensitive means, a second light input light source indicating said second indicia actively coupled to said first light sensitive means, a second light sensitive means actively connected to said other light source, means connecting said second light sensitive means to said first segment so that said first segment is inhibited when said second light sensitive means is activated.

9. A logic system as in claim 1 for inhibiting a load in response to a visual input signal, said load requiring a predetermined voltage across its terminals for energization thereof, an element requiring a voltage less than said predetermined voltage for energization thereof, a power source, a series circuit comprising said power source, said element and one of said means responsive to light energy, and means connecting said series circuit in parallel with said load.

10. A logic system comprising a plurality of input lamps which are lit according to a first predetermined code system, light sensitive means, another lamp, means forming a plurality of light paths selectively coupling said other lamp and said input lamps with said light sensitive means, means connecting said other lamp to one of said sensitive means not actively coupled to said other lamp, and output means selectively connected to said light sensitive means according to a second predetermined code system.

11. A decimal digit readout system comprising first and second spaced members, said first member mounting a first row of input lamps which are lit one at a time for indicating the digits "0," "2," "3," "5" and "6" and a second row of input lamps which are lit one at a time for indicating the digits "1," "4," "7" and an ODD lamp which is lit whenever an odd digit is indicated, said second member having first and second slots through which extend said first and second rows of input lamps, a first pair of photoconductors mounted on said second member on one side of said first slot and a second pair of photoconductors mounted on said second member on the other side of said first slot, a third pair of photoconductors mounted on said second member on one side of said second slot and a fourth pair of photoconductors mounted on said second member on the other side of said second slot; a first baffle element enclosing said first row of lamps, and said first and second pair of photoconductors, said first baffle element having light shields forming predetermined light paths from said first row of lamps to said first and second pair of photoconductors; a second baffle element enclosing said second row of lamps and said third and fourth pair of photoconductors, said second baffle element supporting another photoconductor and lamp, said second baffle element having light shields forming predetermined light paths from said second row of lamps and said other lamp to said third and fourth pair of photoconductors and said other photoconductor.

12. A logic system for energizing a visual indicia readout device comprising a plurality of light sources selectively energized in a first predetermined code system, a plurality of light responsive means, means for providing a plurality of light paths interconnecting said light sources and said light responsive means, a first light responsive means of said plurality of light responsive means being activated by a first light source of said plurality of light sources, a second light source of said plurality of light sources being responsively connected to said first light responsive means, a second light responsive means of said plurality of light responsive means being activated by said second light source, and means responsively connecting said second light sensitive means to said indicia readout device.

13. A logic system comprising a plurality of light sources selectively energized in a first predetermined code system, a plurality of means responsive to light energy, and means including a plurality of opaque baffles for providing a plurality of discrete light paths greater in number than said plurality of light responsive means at least interconnecting a first one of said light sources with a single one of said light responsive means, and at least interconnecting a second one of said light sources with a group of said light responsive means so that an output is generated by said light responsive means in a second predetermined code system.

References Cited in the file of this patent

UNITED STATES PATENTS

| | | |
|---|---|---|
| 2,830,285 | Davis | Apr. 8, 1958 |
| 2,855,539 | Hoover | Oct. 7, 1958 |
| 2,900,522 | Reis | Aug. 18, 1959 |
| 2,906,819 | Smith | Sept. 29, 1959 |
| 2,921,204 | Hastings et al. | Jan. 12, 1960 |
| 2,922,993 | Sack | Jan. 26, 1960 |
| 2,930,896 | Raymond | Mar. 29, 1960 |
| 2,950,418 | Reis | Aug. 23, 1960 |
| 2,953,776 | Blutman | Sept. 20, 1960 |
| 2,954,476 | Ghandi | Sept. 27, 1960 |
| 2,958,009 | Bowerman | Oct. 25, 1960 |
| 2,966,616 | Mash | Dec. 27, 1960 |
| 2,999,165 | Lieb | Sept. 5, 1961 |

OTHER REFERENCES

Lyman and Jones: "Electroluminescent Panels for Automatic Displays," Electronics, July 10, 1959, pp. 44 to 47.